US012543142B2

(12) United States Patent
Ikeda et al.

(10) Patent No.: US 12,543,142 B2
(45) Date of Patent: Feb. 3, 2026

(54) INFORMATION PROCESSING DEVICE AND NON-TRANSITORY COMPUTER-READABLE STORAGE MEDIUM STORING PROGRAM

(71) Applicant: SEIKO EPSON CORPORATION, Tokyo (JP)

(72) Inventors: Iwane Ikeda, Nagano (JP); Hiroyuki Kuramoto, Shiojiri (JP); Yui Imamura, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 350 days.

(21) Appl. No.: 18/150,172

(22) Filed: Jan. 4, 2023

(65) Prior Publication Data

US 2023/0217405 A1 Jul. 6, 2023

(30) Foreign Application Priority Data

Jan. 6, 2022 (JP) ................................ 2022-001131

(51) Int. Cl.
*H04W 64/00* (2009.01)
*H04N 1/00* (2006.01)

(52) U.S. Cl.
CPC ...... *H04W 64/003* (2013.01); *H04N 1/00427* (2013.01); *H04W 64/006* (2013.01)

(58) Field of Classification Search
CPC . H04W 64/003; H04W 64/006; H04W 8/005; H04W 84/18; H04W 4/02; H04W 4/026; H04W 4/80; H04W 48/10; H04W 48/16; H04W 84/12; H04W 48/18; H04W 52/0229; H04W 28/0268; H04W 88/02; H04W 88/04; H04W 48/14; H04W 72/02; H04W 76/14; H04W 4/024;
(Continued)

(56) References Cited

U.S. PATENT DOCUMENTS 8,150,337 B2 4/2012 Isozu
11,048,452 B2 6/2021 Sato
(Continued)

FOREIGN PATENT DOCUMENTS

| JP | 2009147646 | 7/2009 |
| JP | 2012095265 | 5/2012 |
| JP | 2017-059063 A | 3/2017 |
| JP | 2018153962 | 10/2018 |
| JP | 2019149666 | 9/2019 |

(Continued)

*Primary Examiner* — Nimesh Patel
(74) *Attorney, Agent, or Firm* — WORKMAN NYDEGGER

(57) ABSTRACT

An information processing device wirelessly communicates with an electronic device via a wireless communication unit and includes a search result acquisition unit, a direction information acquisition unit, and a controller. The search result acquisition unit acquires information of a search result about the electronic device by a search via the wireless communication unit. The direction information acquisition unit acquires direction information representing a direction in which the electronic device exists, by short-range wireless communication with the electronic device via the wireless communication unit. The controller makes a determination about whether the electronic device found by the search is located within a range in a predetermined direction or not, based on the information of the search result and the direction information, and executes display processing of displaying a screen relating to the electronic device that is a target of the determination.

6 Claims, 11 Drawing Sheets

(58) Field of Classification Search
CPC . H04W 40/246; H04W 72/542; H04W 72/56; H04W 72/563; H04W 84/042; H04W 92/18; H04W 4/029; H04W 4/70; H04W 12/63; H04W 40/02; H04W 64/00; H04N 1/00427; H04N 1/00307; H04N 1/00315; H04N 1/00411; H04N 1/00474; H04M 1/72412; H04M 1/72415; H04M 2250/02; H04M 1/04; H04M 1/72454; H04M 1/72457; H04M 2250/06; H04M 1/6066; H04M 2250/22; G06F 3/0482; G06F 16/00; G06F 16/638; G06F 21/606; G06F 3/0481; G06F 3/04842; G06F 3/04845; G09G 2360/04; G09G 2370/16; G09G 2354/00; G09G 5/32; G01C 21/265; G01C 21/3661; G01C 21/367; G01C 21/20; G01C 21/34; G01C 21/26; G01C 21/36; G01C 21/3676; G01C 21/3682; G01C 21/3688; G01C 21/3691; G01C 21/3694

See application file for complete search history.

(56) References Cited

U.S. PATENT DOCUMENTS

| | | | |
|---|---|---|---|
| 11,224,003 B2 * | 1/2022 | Abe | H04W 8/005 |
| 11,282,482 B2 | 3/2022 | Yano | |
| 11,321,029 B2 | 5/2022 | Konji | |
| 2009/0154398 A1 | 6/2009 | Isozu | |
| 2012/0077515 A1 | 3/2012 | Oishi | |
| 2017/0085694 A1 | 3/2017 | Shibao | |
| 2018/0267751 A1 | 9/2018 | Sato | |
| 2019/0020971 A1 * | 1/2019 | Ginsberg | H04W 4/023 |
| 2019/0265924 A1 | 8/2019 | Ikeda | |
| 2019/0361950 A1 * | 11/2019 | Ganesan | G06F 3/0346 |
| 2020/0379696 A1 | 12/2020 | Konji | |
| 2020/0380937 A1 | 12/2020 | Yano | |
| 2020/0383036 A1 | 12/2020 | Abe | |
| 2021/0132876 A1 * | 5/2021 | Komatsu | H04M 1/72409 |

FOREIGN PATENT DOCUMENTS

| | | |
|---|---|---|
| JP | 2020197432 | 12/2020 |
| JP | 2020198521 | 12/2020 |

\* cited by examiner

INFORMATION PROCESSING DEVICE AND NON-TRANSITORY COMPUTER-READABLE STORAGE MEDIUM STORING PROGRAM

The present application is based on, and claims priority from JP Application Serial Number 2022-001131, filed Jan. 6, 2022, the disclosure of which is hereby incorporated by reference herein in its entirety.

BACKGROUND

1. Technical Field

The present disclosure relates to an information processing device and a non-transitory computer-readable storage medium storing a program, or the like.

2. Related Art

According to the related art, a technique of transmitting electronic data stored in an information processing device to an electronic device via wireless communication and causing the electronic device to execute a job based on the electronic data is known. JP-A-2017-059063 discloses a technique of displaying an electronic device searched out via wireless communication on a predetermined display unit of the information processing device.

However, a technique of displaying a search result about an electronic device located within a predetermined range, based on information about the direction of the electronic device, is not disclosed.

SUMMARY

An aspect of the present disclosure relates to an information processing device wirelessly communicating with an electronic device via a wireless communication unit. The information processing device includes: a search result acquisition unit acquiring information of a search result about the electronic device by a search via the wireless communication unit; a direction information acquisition unit acquiring direction information representing a direction in which the electronic device exists, by short-range wireless communication with the electronic device via the wireless communication unit; and a control unit making a determination about whether the electronic device found by the search is located within a range in a predetermined direction or not, based on the information of the search result and the direction information, and executing display processing of displaying a screen relating to the electronic device that is a target of the determination.

Another aspect of the present disclosure relates to a non-transitory computer-readable storage medium storing a program. The program causes a computer to function as: a wireless communication unit wirelessly communicating with an electronic device; a search result acquisition unit acquiring information of a search result about the electronic device by a search via the wireless communication unit; a direction information acquisition unit acquiring direction information representing a direction in which the electronic device exists, by short-range wireless communication with the electronic device via the wireless communication unit; and a control unit making a determination about whether the electronic device found by the search is located within a range in a predetermined direction or not, based on the information of the search result and the direction information, and executing display processing of displaying a screen relating to the electronic device that is a target of the determination.

BRIEF DESCRIPTION OF THE DRAWINGS

FIG. 1 explains an example of the configuration of an information processing device, or the like.

DESCRIPTION OF EXEMPLARY EMBODIMENTS

An embodiment will now be described. However, the embodiment described below should not unduly limit the contents of the present disclosure described in the claims. Not all the components described in the embodiment are necessarily essential components of the present disclosure.

Figure 1:
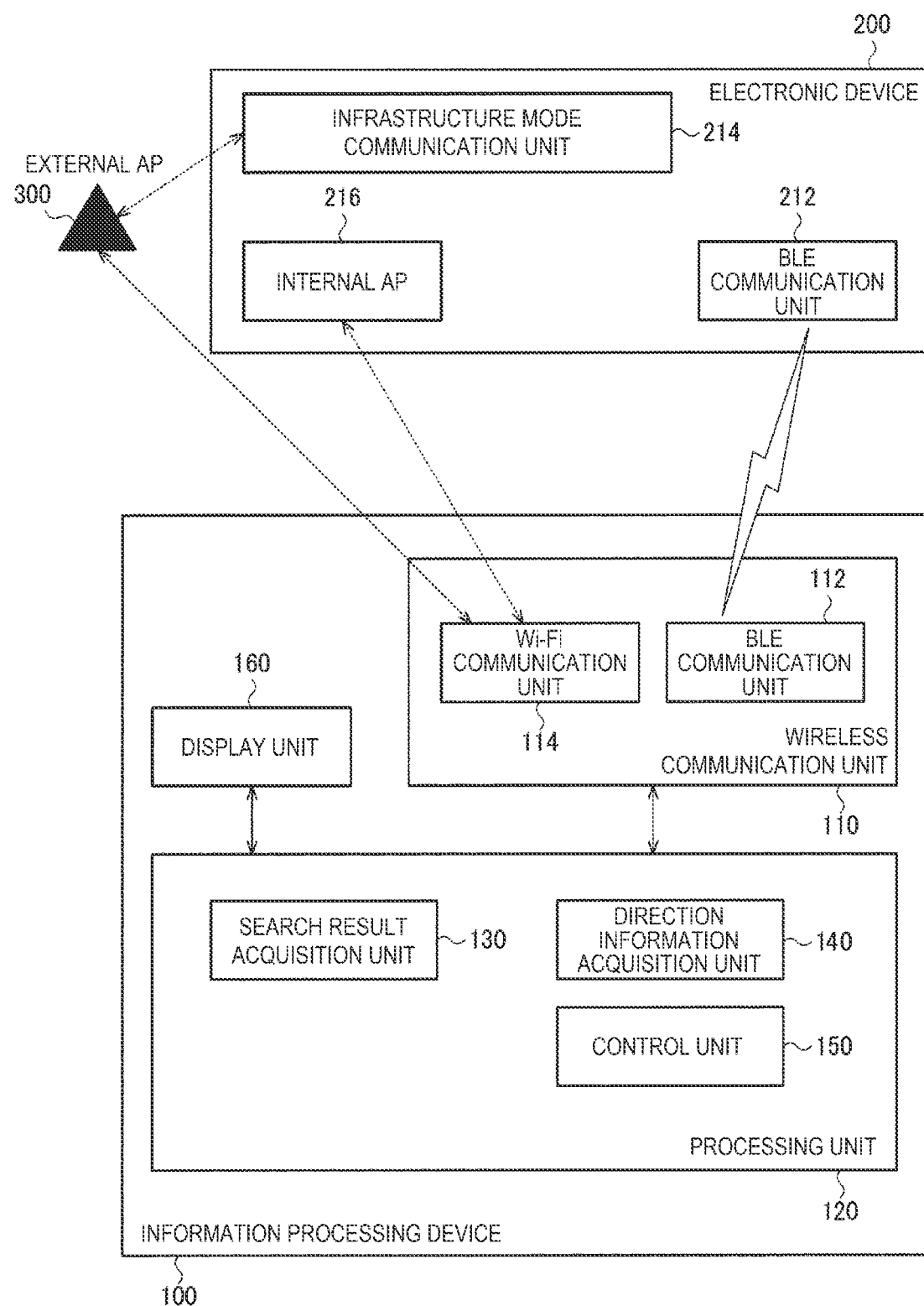

FIG. 1 is a block diagram explaining an example of the configuration of an information processing device 100 according to this embodiment, and a system including the information processing device 100 and an electronic device 200. The information processing device 100 includes a wireless communication unit 110, a processing unit 120, and a display unit 160. The information processing device 100 wirelessly communicates with the electronic device 200 via the wireless communication unit 110. However, the information processing device 100 in this embodiment is not limited to the configuration shown in FIG. 1 and can be implemented with various modifications such as omitting a part of the components thereof or adding another component. The another component is, for example, an operation unit, a memory or the like. The display unit 160 is formed of a display or the like displaying various kinds of information to a user. The display unit 160 can be implemented, for example, by a liquid crystal display, an organic EL display, a dot matrix LED or the like. Also, the display unit 160 and an operation unit, not illustrated, can be formed as an integrated piece of hardware, for example, in the form of a touch panel. The electronic device 200 is, for example, a printer but may be a personal computer, a wearable device, a biological information measuring device, a robot, a video device, or a physical quantity measuring device or the like. The wearable device refers to a smartwatch or an activity tracker or the like. The biological information measuring device refers to a pulsimeter or a pedometer or the like. The video device refers to a camera or a projector or the like. The physical quantity measuring device refers to a thermometer or a weight scale or the like. The printer in this example includes a multifunction peripheral. The multifunction peripheral refers to a printer including other functions than a printer function. The other functions than the printer function include a copy function, a facsimile function, or a scanner function or the like, and may also be other functions. The configuration of the system including the information processing device 100 and the electronic device 200 according to the embodiment is not limited to the example shown in FIG. 1. For example, the information processing device 100 may wirelessly communicate with a plurality of electronic devices 200, and the electronic device 200 may wirelessly communicate with a plurality of information processing devices 100.

The wireless communication unit 110 is a communication interface performing wireless communication conforming to a predetermined wireless communication standard. The wireless communication unit 110 can be implemented, for example, by hardware for communication such as an ASIC (application-specific integrated circuit) for communication or a processor for communication, and firmware for communication or the like. In this embodiment, a control unit 150, described later, performs communication control processing such as transmission processing and reception processing for information, to the wireless communication unit 110, and thus enables the wireless communication unit 110 to transmit information to an external device such as the electronic device 200 and to receive information from the external device. As the predetermined wireless communication standard, a plurality of types may be employed. That is, the wireless communication unit 110 includes hardware and firmware for communication or the like corresponding to a desired wireless communication standard.

The wireless communication unit 110 can perform wireless communication conforming to a short-range wireless communication standard such as Bluetooth (trademark registered), as the predetermined wireless communication standard. In this embodiment, Bluetooth includes BLE (Bluetooth Low Energy) and may be simply referred to as BLE in the description below. For example, as shown in FIG. 1, the wireless communication unit 110 of the information processing device 100 in this embodiment includes a BLE communication unit 112 and the electronic device 200 includes a BLE communication unit 212. Thus, BLE communication can be implemented between the information processing device 100 and the electronic device 200. The BLE communication unit 112 or the like in this embodiment is in conformity with the standard of Bluetooth from version 5.1 onward. In other words, each unit included in the information processing device 100 and the electronic device 200 in this embodiment is in conformity with the standard of Bluetooth from version 5.1 onward.

The wireless communication unit 110 can also perform wireless communication conforming to, for example, Wi-Fi (trademark registered) as the predetermined wireless communication standard, in a predetermined connection mode. The predetermined connection mode is, for example, a Wi-Fi infrastructure mode. That is, as shown in FIG. 1, for example, the wireless communication unit 110 of the information processing device 100 includes a Wi-Fi communication unit 114 and the electronic device 200 includes an infrastructure mode communication unit 214. Thus, communication in the Wi-Fi infrastructure mode can be implemented via an external access point 300. In the description and illustrations below, an access point may be referred to as AP. For example, the external access point 300 periodically broadcasts a wireless communication radio wave such as a beacon in such a way that identification information of the external access point 300 can be deciphered, and connection in the Wi-Fi infrastructure mode is established by a technique, described later. The identification information of the external access point 300 is, for example, an SSID (service set identifier). In the description below, "communication connection conforming to a communication standard" is simply referred to as "connection", where appropriate. An access point can also be referred to as a router. In the case where communication in the Wi-Fi infrastructure mode has been established, connection with the external access point 300 is automatically established even if the communication is temporarily disconnected.

The predetermined connection mode may also be a Wi-Fi Direct (trademark registered) mode. In the description and illustrations below, Wi-Fi Direct may be referred to as direct connection. For example, as shown in FIG. 1, the wireless communication unit 110 of the information processing device 100 includes the Wi-Fi communication unit 114 and the electronic device 200 includes an internal access point 216. Thus, direct connection can be implemented. That is, the electronic device 200 is an owner of a group where the information processing device 100 is a client, and the internal access point 216 functions as a software access point. For example, the internal access point 216 periodically broadcasts a wireless communication radio wave such as a beacon conforming to the direct connection standard. An advertisement packet of this wireless communication radio wave includes information such as an SSID that is identification information of the internal access point 216. The Wi-Fi communication unit 114 executes a scan to receive the wireless communication radio wave broadcast from the internal access point 216. The scan in this case is a passive scan but may be an active scan. The Wi-Fi communication unit 114 makes a connection request to the internal access point 216. A signal for this connection request includes information such as a password corresponding to the SSID of the internal access point 216. This enables the connection between the Wi-Fi communication unit 114 and the internal access point 216. After communication via direct connection is established and this communication is temporarily disconnected, the user may be requested to configure a connection setting again for the reason that an encryption key is changed, or the like. The above description does not preclude the inclusion of other wireless connection modes such as an ad-hoc mode, and a connection mode based on wired communication or the like, as the predetermined connection mode. At each electronic device 200, the predetermined connection mode can be arbitrarily enabled or disabled. For example, the user can enable only the Wi-Fi infrastructure mode between the information processing device 100 and the electronic device 200.

The processing unit 120 controls input and output of data from and to each functional unit including the foregoing wireless communication unit 110. The processing unit 120 executes various kinds of computational processing, based on a predetermined program read out from a memory, not illustrated, an operation input signal from an operation unit, not illustrated, or various data or the like received via the wireless communication unit 110, and controls a display output operation to the display unit 160 or a data output operation to the electronic device 200, or the like. The predetermined program refers to, for example, basic software such as an OS (operating system), various application programs operating based on the basic software, or both of these, or the like. The processing unit 120 can be implemented by a processor. That is, each processing in this embodiment can be implemented by a processor operating based on information such as a program, and a memory, not illustrated, storing information such as a program. The processor may be, for example, individual pieces of hardware implementing functions of individual units or may be a unified piece of hardware implementing functions of individual units. For example, the processor includes hardware and the hardware can include at least one of a circuit processing a digital signal and a circuit processing an analog signal. For example, the processor can also be formed of one or a plurality of circuit devices or one or a plurality of circuit elements installed on a circuit board. The processor may be, for example, a CPU (central processing unit). However, the processor is not limited to a CPU. Various processors such as a GPU (graphics processing unit) or a DSP (digital signal processor) can be used. The processor may also be a hardware circuit formed of an ASIC. The processor may also include an amplifier circuit and a filter circuit or the like processing an analog signal.

The processing unit 120 in this embodiment includes a search result acquisition unit 130, a direction information acquisition unit 140, and the control unit 150. That is, the information processing device 100 in this embodiment includes the search result acquisition unit 130, the direction information acquisition unit 140, and the control unit 150. For example, the processing unit 120 reads out and executes a predetermined application program, described later, from a memory, not illustrated, and thus implements the functions of the search result acquisition unit 130, the direction information acquisition unit 140, and the control unit 150. When an operation of this predetermined application program needs basic software that serves as a base, the processing unit 120 may read out a program of the basic software from a memory, not illustrated, and thus may be able to implement, for example, the function of the control unit 150.

The search result acquisition unit 130 acquires information of a search result about the electronic device 200 based on a search by the wireless communication unit 110. Specifically, for example, the BLE communication unit 212, the internal access point 216 or the like of the electronic device 200 broadcasts a wireless communication radio wave conforming to various wireless communication standards. The control unit 150 operating as the basic software converts the information of the search result based on information or the like included in an advertisement packet received via at least one of the BLE communication unit 112 and the Wi-Fi communication unit 114 into information corresponding to the predetermined application program, described later, and transmits the converted information to the search result acquisition unit 130. Thus, the search result acquisition unit 130 can acquire the information of the search result. In the description below, that the BLE communication unit 212 or the internal access point 216 of the electronic device 200 broadcasts the advertisement packet or the like may be simply described as that the electronic device 200 broadcasts the advertisement packet or the like.

The direction information acquisition unit 140 acquires direction information representing the direction in which the electronic device 200 exists, by short-range wireless communication with the electronic device 200 by the wireless communication unit 110. The acquisition of the direction information can be implemented, for example, by a technique described below. For example, it is assumed that the BLE communication unit 212 of the electronic device 200 broadcasts a BLE advertisement packet, as described above, and that the BLE communication unit 112 receiving this advertisement packet includes a plurality of reception antennas. In this case, the advertisement packet reaches the individual reception antennas with a time difference. Therefore, an angle of arrival AOA of the radio wave can be estimated, based on a first computation technique using the distance between the individual antennas and the wavelength of the radio wave, which are known. The technique for estimating the angle of arrival AOA including the first computation technique is known and therefore is not described further in detail here.

The acquisition of the direction information may also be implemented, for example, by a technique described below. The BLE communication unit 212 of the electronic device 200 includes a plurality of transmission antennas and broadcasts a BLE advertisement packet while shifting the timing of transmitting the radio wave from each transmission antenna. In this case, this advertisement packet includes information of the timing when each transmission antenna transmits the advertisement packet and distance information between the individual transmission antennas. The BLE communication unit 112 can estimate an angle of departure AOD of the radio wave, based on a second computation technique using the phase difference between the advertisement packets received from the individual transmission antennas, and the information of the transmission timing and the distance information between the transmission antennas included in the advertisement packet. The technique for estimating the angle of departure AOD including the second computation technique is known and therefore is not described further in detail here.

The control unit 150 performs display control of the display unit 160, based on predetermined information. The predetermined information in this case is, for example, the information of the search result, but may be the direction information, described later, or may be other information. Specifically, for example, the control unit 150 in this embodiment displays information of the electronic device 200 found by the search, on the display unit 160, based on the information of the search result. The control unit 150 may also function as basic software or the like, as described above.

An example of processing in the technique according to this embodiment will now be described, using the flowchart of FIG. 2. For example, the information processing device 100 generates timer interrupt processing every predetermined time from the timing when the user starts the predetermined application program, described later, and thus repeatedly executes the processing shown in FIG. 2. However, this is not limiting. For example, the information processing device 100 may repeatedly execute the processing shown in FIG. 2 by loop processing.

The information processing device 100 executes search processing (step S100). For example, when the information processing device 100 and the electronic device 200 wirelessly communicate with each other in conformity with the BLE standard, identification information of the electronic device 200 is included in a BLE advertisement packet and the information processing device 100 receives the advertisement packet. Thus, the search processing (step S100) can be implemented. The identification information of the electronic device 200 is specifically, for example, a MAC address of the electronic device 200 stored in a payload of a protocol data unit in the advertisement packet, but may be other information that is interconvertible with the MAC address, such as a serial number. In this embodiment, the payload may further include other information. This other information is, for example, information of radio wave intensity, information representing the status of the electronic device 200, or the like. Details thereof will be described later.

Meanwhile, for example, when the information processing device 100 is connected to the external access point 300 by the Wi-Fi infrastructure mode, the Wi-Fi communication unit 114 of the wireless communication unit 110 may search for the electronic device 200 on a network formed by this external access point. More specifically, for example, the Wi-Fi communication unit 114 transmits a response request packet designating a broadcast address or a link-local multicast address to the infrastructure mode communication unit 214 of the electronic device 200. The response request packet is a packet requesting a device receiving this packet to send back a response packet including the identification information of the device. The infrastructure mode communication unit 214 sends back a response packet including the identification information such as the SSID of its own device to the information processing device 100. Thus, the search processing (step S100) can be implemented.

Subsequently, the information processing device 100 executes direction information acquisition processing (step S200). For example, when the BLE communication unit 112 of the wireless communication unit 110 receives an advertisement packet conforming to the BLE standard from the electronic device 200, the control unit 150 calculates the angle of arrival AOA or the angle of departure AOD that is estimated in the manner described above. The control unit 150 then executes processing of converting the received information based on the angle of arrival AOA or the angle of departure AOD into the direction information corresponding to the predetermined application, described later, and transmits the direction information to the direction information acquisition unit 140. For example, the control unit 150 executes processing of converting the angle of arrival AOA or the angle of departure AOD, which is relative information found based on the information processing device 100 or the electronic device 200 as a reference point, in such a way as to correspond to absolute information such as an azimuth. Thus, the direction information acquisition processing (step S200) can be implemented.

Subsequently, the information processing device 100 executes determination processing (step S300). For example, the control unit 150 executes processing of determining whether the electronic device 200 included in the search result is located within a range in a predetermined direction or not, based on the information of the search result acquired in the search processing (step S100) and the direction information acquired in the direction information acquisition processing (step S200). The range in the predetermined direction is, for example, an angle range formed of a predetermined azimuth angle with respect to the direction which the information processing device 100 located on a floor parallel to a horizontal plane faces, as a reference direction. The angle range formed of the predetermined azimuth angle is, for example, an angle range substantially the same as the field of view of the user and may be able to be suitably set by the user. This is because there is little practical advantage in displaying the electronic device 200 that is not in a desired field of view, on the display unit 160 by display processing (step S400), described later.

Subsequently, the information processing device 100 executes the display processing (step S400). For example, the control unit 150 executes display processing of displaying a screen showing the electronic device 200 found by the search processing (step S100) and existing within the range in the predetermined direction, as the result of the determination processing (step S300). The control unit 150 displays information of the electronic device 200 included in the result of the determination processing (step S300), for example, on a screen of the predetermined application of the information processing device 100, described later. More specifically, for example, it is assumed that the user starts the information processing device 100, then connects an electronic device 200-A, not illustrated, in the predetermined application, and starts the information processing device 100 again in order to use the predetermined application. In this case, the processing shown in FIG. 2 is executed as described above. For example, when it is determined by the determination processing (step S300) that the electronic device 200-A is located within the range in the predetermined direction, the control unit 150 displays information representing that the electronic device 200-A is connected, on a home screen of the predetermined application. Thus, the user can recognize that the predetermined application can be used in the same environment as in the previous use.

As described above, the information processing device 100 in this embodiment wirelessly communicates with the electronic device 200 via the wireless communication unit 110 and includes the search result acquisition unit 130, the direction information acquisition unit 140, and the control unit 150. The search result acquisition unit 130 acquires information of a search result about the electronic device 200 by a search via the wireless communication unit 110. The direction information acquisition unit 140 acquires direction information representing a direction in which the electronic device 200 exists, by short-range wireless communication with the electronic device 200 via the wireless communication unit 110. The control unit 150 makes a determination about whether the electronic device 200 found by the search is located within a range in a predetermined direction or not, based on the information of the search result and the direction information, and executes display processing of displaying a screen relating to the electronic device 200 that is a target of the determination.

In this way, the information processing device 100 in this embodiment includes the wireless communication unit 110 and thus can wirelessly communicate with the electronic device 200. The information processing device 100 also includes the search result acquisition unit 130 and the direction information acquisition unit 140 and thus can acquire the search result and the direction information of the electronic device 200, based on the wireless communication. The information processing device 100 also includes the control unit 150 and the control unit 150 makes a determination about whether the electronic device 200 found by the search is located within the range in the predetermined direction or not, based on the information of the search result and the direction information. Thus, the processing for grasping the existence of the electronic device 200 located in a desired range can be implemented. The control unit 150 also executes the display processing of displaying a screen showing the electronic device 200 based on the result of the determination. Thus, the user can grasp the electronic device 200 located within the range in the predetermined direction. Therefore, the user can properly determine the electronic device 200 to be selected.

Up to now, the information processing device 100 executing the display processing of displaying a screen showing the electronic device 200 based on the result of the determination about whether the electronic device 200 is located in the range in the predetermined direction or not, has not been proposed. In the related-art technique, for example, the electronic device 200 located in a direction to which the user is unlikely to move may be displayed, and the user may not be able to properly determine the electronic device 200 to be selected. In this regard, when the technique according to this embodiment is applied, only the electronic device 200 located within the range in the predetermined direction is displayed and therefore the user can more properly determine the electronic device 200 to be selected. For example, if the user knows that a previously used electronic device 200 is located within the range in the predetermined direction, the user can determine that the electronic device 200 can be used at the current location of the user. Also, for example, if the user knows that a desired electronic device 200 is not located within the range in the predetermined direction, the user can determine that the user should move to another location.

The technique in this embodiment may be implemented by a program. That is, the program in this embodiment causes a computer to function as the wireless communication unit 110 wirelessly communicating with the electronic device 200, the search result acquisition unit 130, the direction information acquisition unit 140, and the control unit 150. The search result acquisition unit 130 acquires information of a search result about the electronic device 200 by a search via the wireless communication unit 110. The direction information acquisition unit 140 acquires direction information representing a direction in which the electronic device 200 exists, by short-range wireless communication with the electronic device 200 via the wireless communication unit 110. The control unit 150 makes a determination about whether the electronic device 200 found by the search is located within a range in a predetermined direction or not, based on the information of the search result and the direction information, and executes display processing of displaying a screen relating to the electronic device 200 that is a target of the determination. Thus, an effect similar to the foregoing effect can be achieved.

Figure 3:
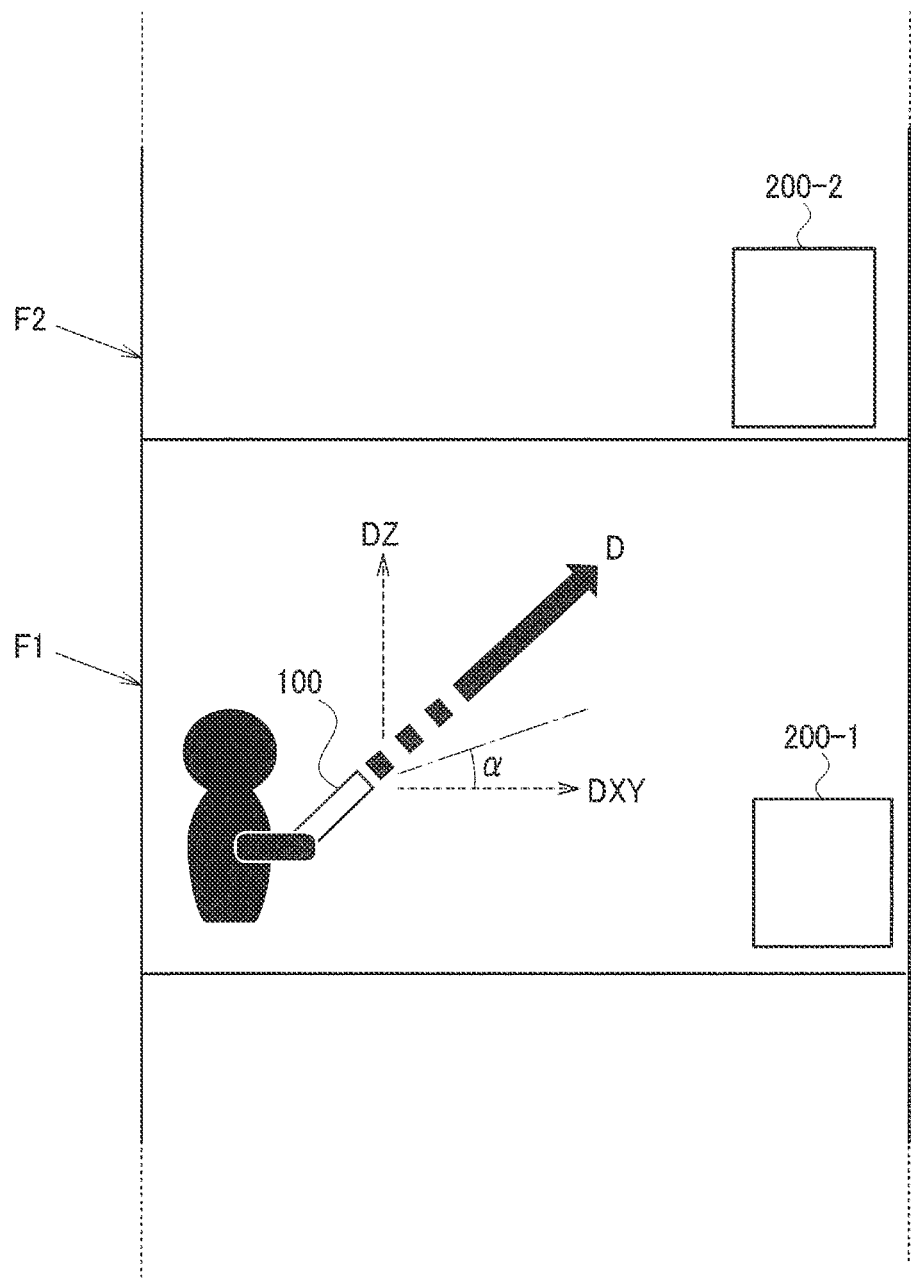
FIG. 3 explains an example of a predetermined direction.

The technique in this embodiment is not limited to the above and can be implemented with various modifications. For example, the predetermined direction may be an angle range formed of a predetermined angle of elevation α from the horizontal direction as a reference direction. The predetermined angle of elevation α may also be able to be suitably set by the user according to the size and height of the floor where the information processing device 100 is located. For example, it is assumed that, in a building having a predetermined number of floors, the information processing device 100 and an electronic device 200-1 are located on a floor indicated by F1 and that an electronic device 200-2 is located on a floor indicated by F2, as shown in FIG. 3. It is also assumed that the floor indicated by F2 is above the floor indicated by F1. In this case, when the information processing device 100 faces in a direction D in FIG. 3, the search result acquired by the search result acquisition unit 130 in the search processing (step S100) may include the electronic device 200-2. However, the user is unlikely to select the electronic device 200-2 located on the floor that is different from the floor where the user is located. Therefore, there is little practical advantage in displaying information of the electronic device 200-2 on the display unit 160 of the information processing device 100. Therefore, the control unit 150 may execute processing of determining that the electronic device 200 located in a range beyond the predetermined angle of elevation α from a direction DXY parallel to the horizontal direction, as a reference direction, is not located within the range in the predetermined direction, in the determination processing (step S300). Thus, in the display processing (step S400), the information of the electronic device 200-2 is not displayed on the display unit 160 of the information processing device 100. Therefore, the information processing device 100 can display the electronic device 200 that is proper as a display target.

These processes can be implemented, for example, by a technique described below, though the presentation of a mathematical formula or the like is omitted. The control unit 150 can acquire information of a direction vector in the direction of gravity, that is, perpendicular to the horizontal plane, by a geomagnetic sensor or a gyro sensor, not illustrated, that is included in the information processing device 100. Thus, the control unit 150 can resolve, for example, a direction vector parallel to the direction D in FIG. 3 into a direction vector parallel to the direction DXY and a direction vector parallel to a direction DZ. The direction DZ is a direction parallel to the direction perpendicular to the horizontal plane. The direction DXY is a direction parallel to the horizontal plane. The control unit 150 then finds a direction vector parallel to a direction connecting the information processing device 100 and the electronic device 200-2, from the direction information acquired in the direction information acquisition processing (step S200), and thus can find the angle of elevation α, based on the relationship between this direction vector and the direction vector parallel to the direction DXY.

While the angle of elevation α is used as an example in the above description, the technique in this embodiment can be similarly applied to an angle of depression. That is, when the electronic device 200-2 is located on a floor below the floor where the information processing device 100 is located, the control unit 150 executes processing of determining whether the electronic device 200-2 is within a range of a predetermined angle of depression from the horizontal direction by a technique similar to the above and thus can execute processing of eliminating the electronic device 200-2 from the display target. Also, both the angle range formed of the angle of elevation α and the angle range formed of the predetermined angle of depression may be taken into consideration as the predetermined angle range. Moreover, the angle range formed of the predetermined azimuth angle may be limited with respect to the horizontal direction.

In this way, in the information processing device 100 in this embodiment, the control unit 150 executes the processing of determining whether or not the electronic device 200 is located within the predetermined angle range including the horizontal direction, as the range in the predetermined direction. Thus, the user can mainly grasp the information of the electronic device 200 located in the horizontal direction. Therefore, for example, the user can be prevented from selecting the electronic device 200 located on a different floor, or the like.

Figure 4:
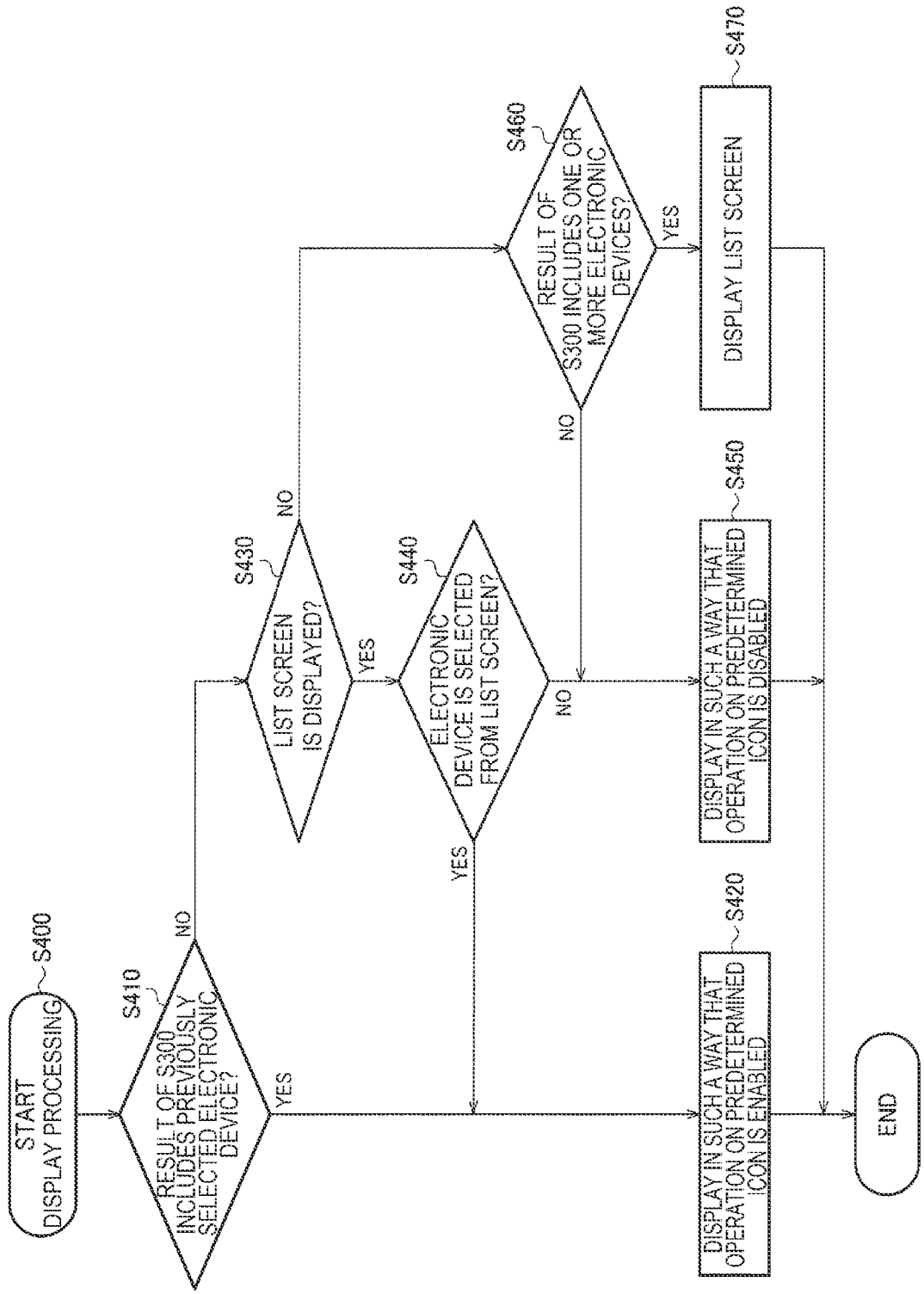
FIG. 4 is a flowchart explaining a processing example of display processing.

FIG. 4 is a flowchart showing a more detailed processing example of the display processing (step S400). The control unit 150 executes processing of determining whether the result of the determination processing (step S300) includes a previously selected electronic device 200 or not (step S410). When the control unit 150 has determined that the result of the determination processing (step S300) includes the previously selected electronic device 200 (YES in step S410), the control unit 150 executes processing of displaying a predetermined icon in such a way that an operation on the predetermined icon is enabled (step S420), and then ends the flow. Meanwhile, when the control unit 150 has determined that the result of the determination processing (step S300) does not include the previously selected electronic device 200 (NO in step S410), the control unit 150 executes processing of determining whether a list screen, described later with reference to FIG. 8 or the like, is displayed or not (step S430). When the control unit 150 has determined that the list screen is displayed (YES in step S430), the control unit 150 executes processing of determining whether an electronic device 200 is selected from the list screen or not (step S440). When the control unit 150 has determined that an electronic device 200 is not selected from the list screen (NO in step S440), the control unit 150 executes processing of displaying a predetermined icon in such a way that an operation on the predetermined icon is disabled (step S450), and then ends the flow. Meanwhile, when the control unit 150 has determined that an electronic device 200 is selected from the list screen (YES in step S440), the control unit 150 executes the processing of step S420.

When the control unit 150 has determined that the list screen is not displayed (NO in step S430), the control unit 150 executes processing of determining whether the result of the determination processing (step S300) includes one or more electronic devices 200 or not (step S460). When the control unit 150 has determined that the result of the determination processing (step S300) includes one or more electronic devices 200 (YES in step S460), the control unit 150 executes processing of displaying a list screen (step S470) and then ends the flow. Meanwhile, when the control unit 150 has determined that the result of the determination processing (step S300) does not include one or more electronic devices 200 (NO in step S460), the control unit 150 executes the processing of step S450.

Figure 5:
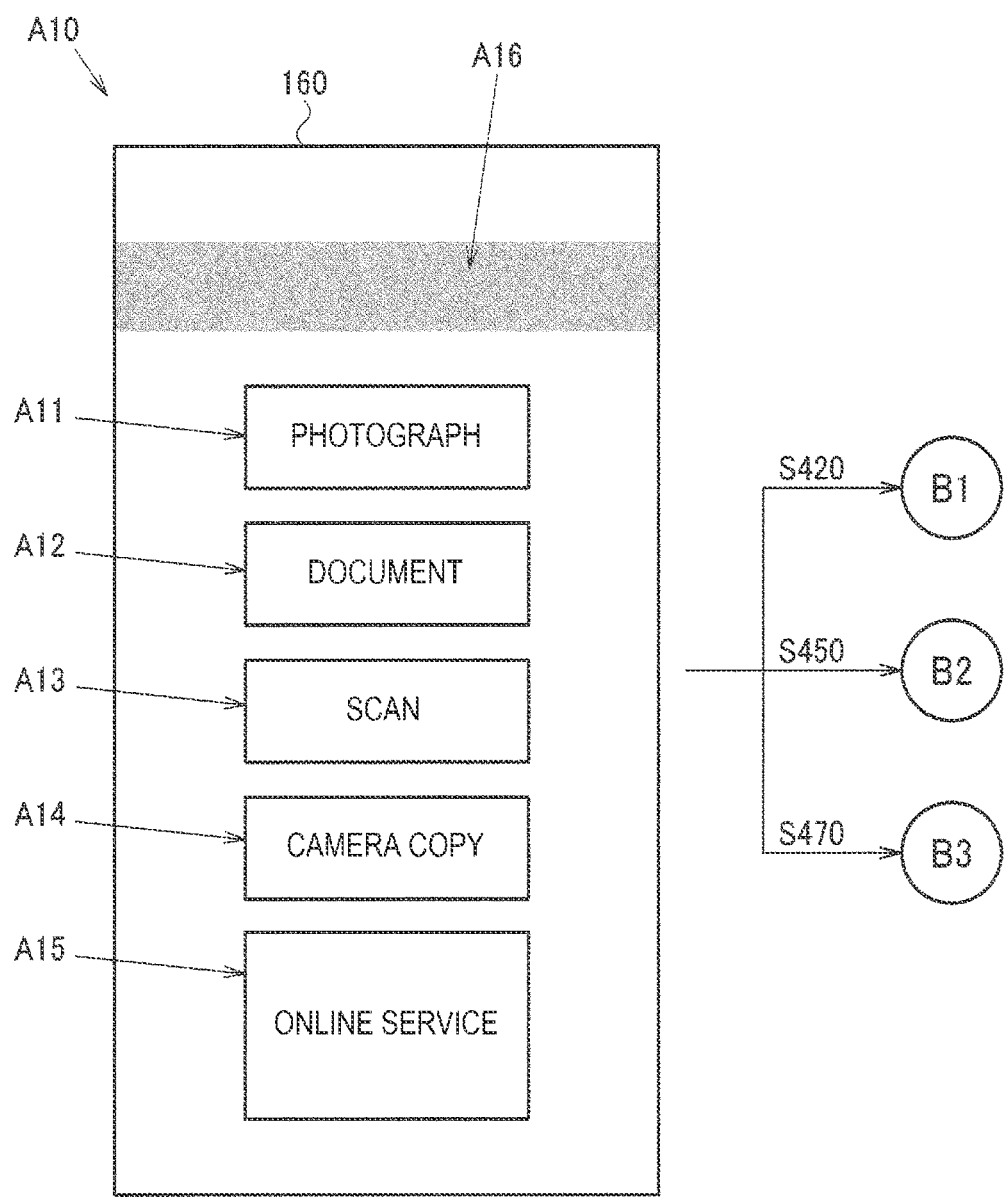
FIG. 5 explains a screen example to which a technique according to an embodiment is applied.

A screen example to which the technique in this embodiment is applied will now be described, using FIGS. 5, 6, 7, 8, and 9. For example, when the user starts the predetermined application program of the information processing device 100, a home screen indicated by A10 in FIG. 5 is displayed. The predetermined application illustrated in FIG. 5 or the like is, for example, a print application. However, the predetermined application is not limited to this and may be another application.

The home screen of the print application indicated by A10 in FIG. 5 is, for example, a screen displayed immediately after the print application is started. In the home screen, one or a plurality of panels corresponding to a function or functions that can be executed by the electronic device 200 are displayed. In the screen example of A10 in FIG. 5, a photograph panel indicated by A11, a document panel indicated by A12, a scan panel indicated by A13, a camera copy panel indicated by A14, and an online service panel indicated by A15 are displayed. As an operation on each panel is performed, the print application executes the corresponding function. The information processing device 100 may also display another panel than the functions indicated by A11 to A15. Also, for example, in a circumstance where the information processing device 100 is connected to a previously connected electronic device 200, the information processing device 100 may display information of this electronic device 200, for example, in an area indicated by A16.

It is assumed that, for example, the user selects the photograph panel indicated by A11 as one of the functions of the predetermined application. At this point, the screen of A10 in FIG. 5 shifts to one of a screen indicated by A20 in FIG. 6, a screen indicated by A30 in FIG. 7, and a screen indicated by A40 in FIG. 8 according to the content of processing executed by the control unit 150.

Figure 6:
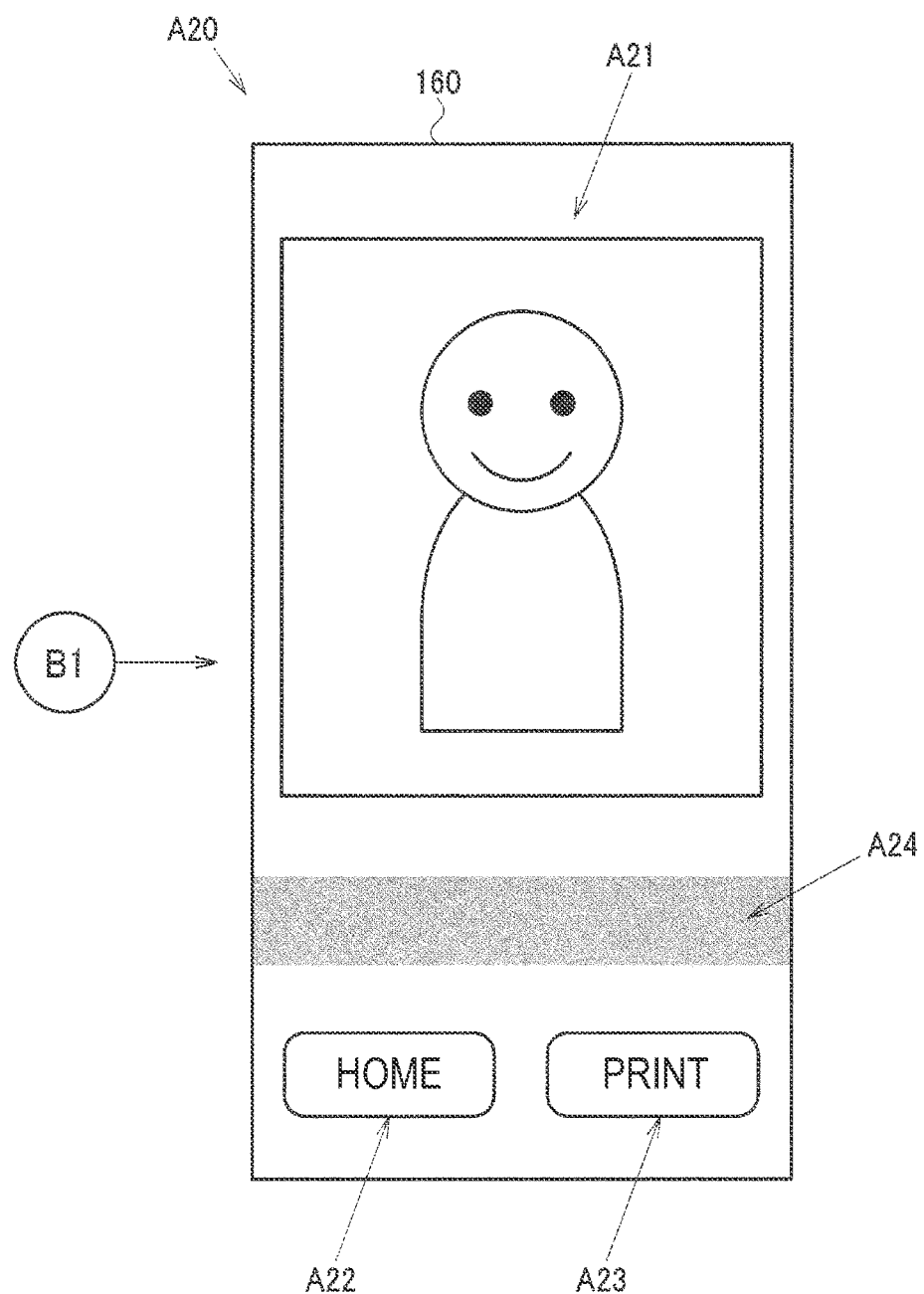
FIG. 6 is another view explaining the screen example to which the technique according to the embodiment is applied.

FIG. 6 shows a screen example of a print execution instruction screen in the case where the processing of step S420 in FIG. 4 is executed. In this screen example, a preview screen of print data indicated by A21, a transition button icon to shift to the home screen indicated by A22, and a print button icon as a predetermined icon indicated by A23 are displayed. Although not illustrated, the information processing device 100 may also display print setting information including information such as the paper size and the paper type used for printing. Also, for example, in a circumstance where the information processing device 100 is connected to the previously connected electronic device 200, as in FIG. 5, the information processing device 100 may display information of this electronic device 200, for example, in an area indicated by A24.

As described above with reference to FIG. 4, when the result of the determination processing (step S300) includes the previously selected electronic device 200, YES is given in step S410 in FIG. 4. Thus, the control unit 150 displays the print button icon in such a way that an operation on the print button icon as the predetermined icon is enabled, as indicated by A23 in FIG. 6. As the user performs an operation to select the print button icon of A23, the information processing device 100 transmits print job data relating to the preview screen indicated by A21 to the electronic device 200, which is a printer. Then, the electronic device 200 executes a print job. Thus, the user can acquire a desired printed material. When the information processing device 100 and the electronic device 200 are connected to each other based on BLE, the control unit 150 may execute processing of making a handover from BLE to Wi-Fi before transmitting the print job data. Thus, the information processing device 100 can transmit a large volume of print job data to the electronic device 200. The functions of the panels indicated by A12 to A15 in FIG. 5 are known and therefore are not described further. By performing a similar operation on these panels, the user can acquire a desired printed material.

Figure 7:
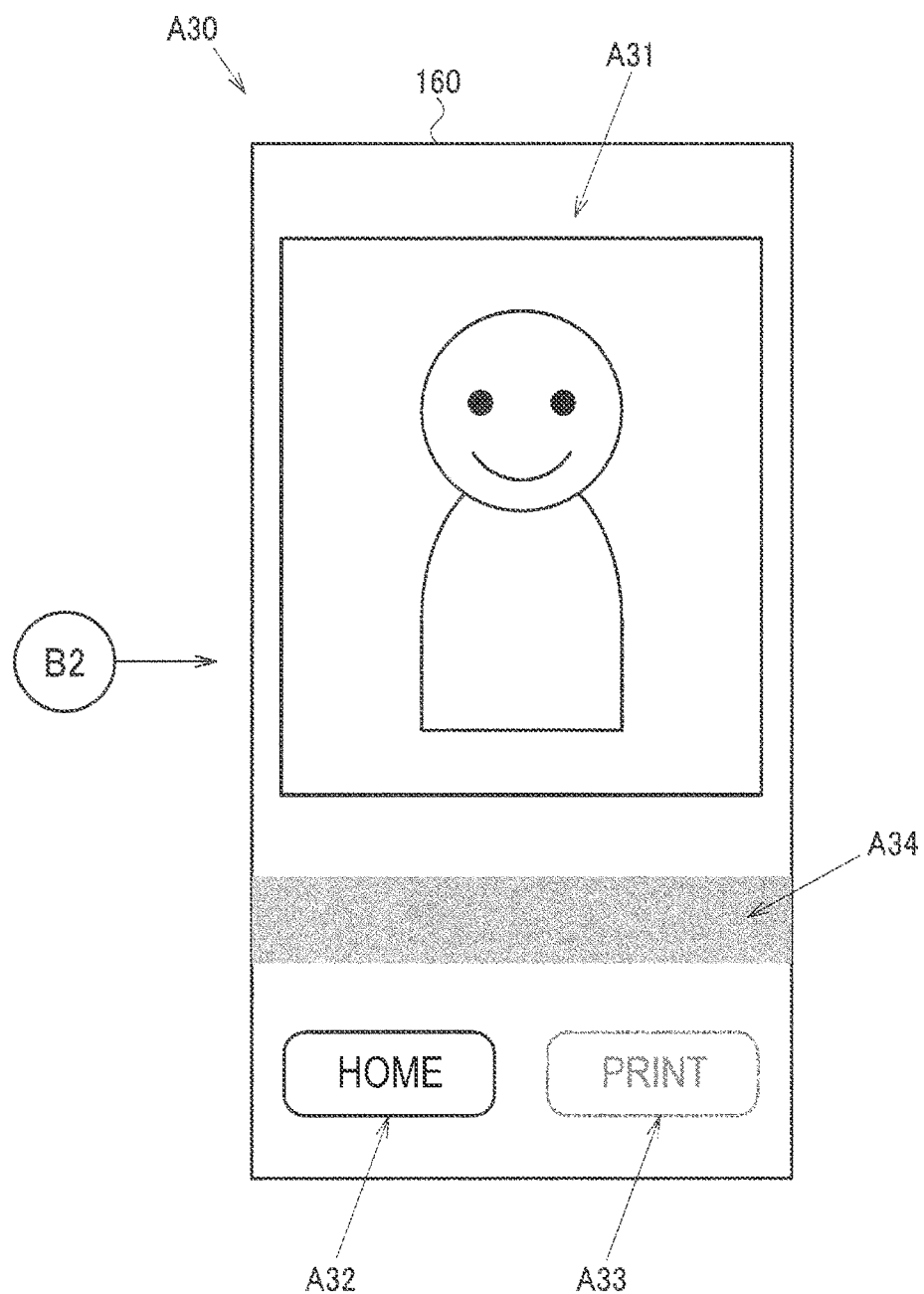
FIG. 7 is another view explaining the screen example to which the technique according to the embodiment is applied.

A30 in FIG. 7 is a screen example of the print execution instruction screen in the case where the processing of step S450 in FIG. 4 is executed. When the result of the determination processing (step S300) in FIG. 2 includes no electronic device 200, NO is given in step S460 in FIG. 4 and the processing of step S450 is executed. Thus, the control unit 150 displays the print button icon in such a way that an operation on the print button icon as the predetermined icon is disabled, as indicated by A33 in FIG. 7. A33 in FIG. 7 displays the print button icon in a light color so that the user can recognize that an operation thereon is disabled. However, the control unit 150 may execute, for example, processing of hiding the print button icon or may execute processing of displaying an icon showing that the print button icon is disabled, as superimposed on the print button icon. A preview screen indicated by A31 in FIG. 7 is similar to the preview screen indicated by A21 in FIG. 6. An icon indicated by A32 in FIG. 7 is similar to the icon indicated by A22 in FIG. 6. An area indicated by A34 in FIG. 7 is similar to the area indicated by A24 in FIG. 6.

In this way, in the information processing device 100 in this embodiment, the control unit 150 executes the processing of enabling an operation on the icon indicating the execution of a job when the result of the determination shows that the electronic device 200 is located within the range in the predetermined direction, and the control unit 150 executes the processing of disabling an operation on the icon when the result of the determination shows that the electronic device 200 is not located within the range in the predetermined direction. Thus, the user can grasp whether the electronic device 200 that can execute a job is located within a desired range or not.

Figure 8:
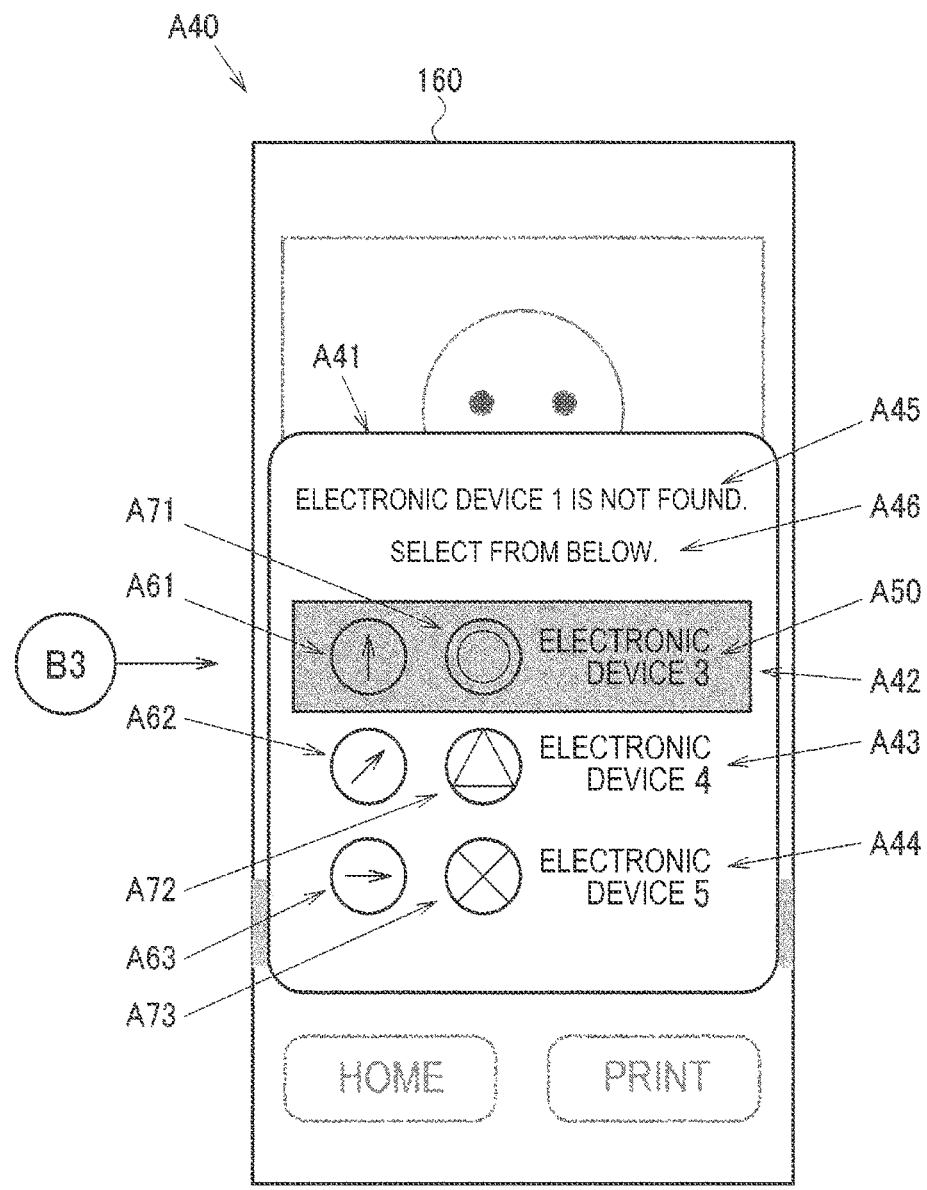
FIG. 8 is another view explaining the screen example to which the technique according to the embodiment is applied.

A40 in FIG. 8 is a screen example of the print execution instruction screen in the case where the processing of step S470 in FIG. 4 is executed. When the result of the determination processing (step S300) in FIG. 2 does not include the previously connected electronic device 200 (NO in step S410) but includes one or more other electronic devices 200 (YES in step S460), the processing of step S470 is executed. Thus, the control unit 150 displays, for example, a list screen as a dialog box on the display unit 160, as indicated by A41 in FIG. 8.

The previously connected electronic device 200 is referred to as the electronic device 200-1. However, in the list screen indicated by A41, the electronic device 200-1 is displayed simply as an electronic device 1. The result of the determination processing (step S300) in FIG. 2 includes an electronic device 200-3, an electronic device 200-4, and an electronic device 200-5. However, the number of electronic devices 200 included in a list view is not limited to three. Also, in the list screen indicated by A41, the electronic device 200-3 is displayed simply as an electronic device 3. Similarly, in the list screen indicated by A41, the electronic device 200-4 is displayed simply as an electronic device 4 and the electronic device 200-5 is displayed simply as an electronic device 5.

In the list screen indicated by A41, information of the electronic device 200-3 is displayed as indicated by A42. Information of the electronic device 200-4 is displayed as indicated by A43. Information of the electronic device 200-5 is displayed as indicated by A44. Also, information that the previously connected electronic device 200-1 is not connected to the information processing device 100 and is not found in the determination processing (step S300) in FIG. 2 is displayed in the list screen, as indicated by A45. Also, information that the user is to select one of the electronic device 200-3, the electronic device 200-4, and the electronic device 200-5 found in the determination processing (step S300) in FIG. 2 is displayed along with the list screen, as indicated by A46. In this way, in the information processing device 100 in this embodiment, when the result of the determination shows that a plurality of electronic devices 200 are found and located within the range in the predetermined direction, the control unit 150 executes the display processing of showing that the plurality of electronic devices 200 are located within the range in the predetermined direction. Thus, the user can grasp the existence of a plurality of electronic devices 200 located in a desired range. Therefore, the user can properly select the optimal electronic device 200.

When the user taps one of an area where the information of the electronic device 200-3 is displayed, an area where the information of the electronic device 200-4 is displayed, and an area where the information of the electronic device 200-5 is displayed, YES is given in step S440 in FIG. 4 and the processing of step S420 is executed. Thus, the screen shifts to a screen similar to A20 in FIG. 6.

Figure 2:
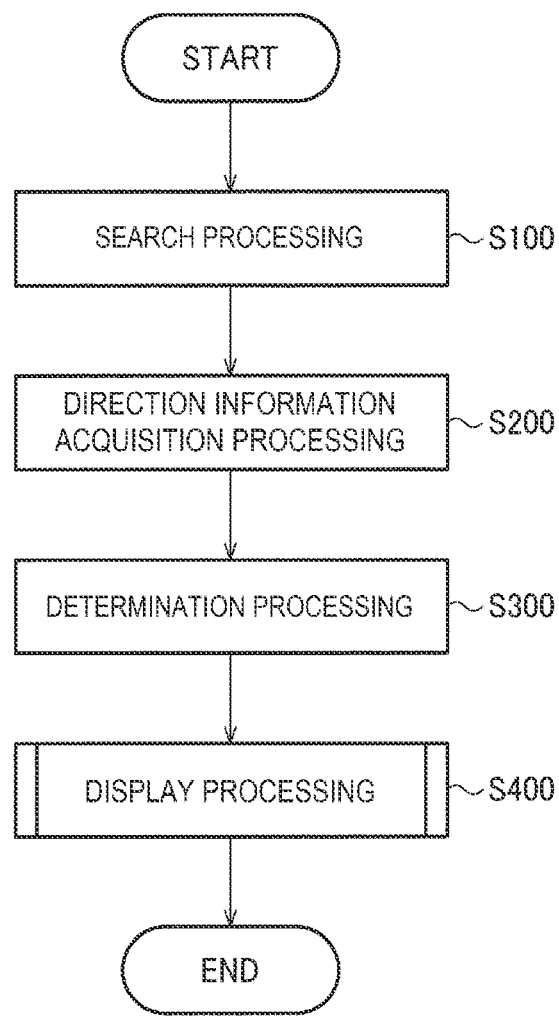
FIG. 2 is a flowchart explaining an example of processing by the information processing device.

The control unit 150 may display the information of the electronic device 200 that is the nearest from the information processing device 100, of the electronic devices 200 found in the determination processing (step S300) in FIG. 2, in a more noticeable form than the information of the other electronic devices 200. For example, when the electronic device 200-3 is the electronic device 200 that is the nearest from the information processing device 100, a predetermined area including the information of the electronic device 200-3 is displayed in a different color from the peripheries, as indicated by A50. Thus, the user can recognize that the electronic device 200-3 is the nearest from the information processing device 100. This can enhance the convenience of the information processing device 100. This is because the electronic device 200 that is the nearest from the user is highly likely to be used by the user and it is convenient for the user to be able to grasp the information of this electronic device 200.

Such processing can be implemented, for example, by a technique described below. When the BLE communication unit 112 of the wireless communication unit 110 receives a radio wave based on BLE, a BLE advertisement packet includes reference radio wave intensity information and therefore the control unit 150 can acquire the information of the distance between the information processing device 100 and the electronic device 200. The reference radio wave intensity is received signal strength indication (RSSI) of a beacon signal at a receiving-side device installed at a location away from a transmitting-side device of the beacon signal by a reference distance. The radio wave intensity is in inverse proportion to the square of the distance. Therefore, if the radio wave intensity at the reference distance is known, the control unit 150 can compute the information about the distance between the information processing device 100 and the electronic device 200 or the like, based on the radio wave intensity of the BLE beacon signal actually received by the wireless communication unit 110.

The control unit 150 may also display information representing which direction the electronic device 200 found in the determination processing (step S300) in FIG. 2 is located in. Specifically, for example, the control unit 150 may display an icon including an arrow facing in a predetermined direction, as the information of the electronic device 200-3, as indicated by A61 in FIG. 8. The control unit 150 may also display an icon similar to the icon indicated by A61, as the information of the electronic device 200-4, as indicated by A62. The control unit 150 may also display an icon similar to the icons indicated by A61 and A62, as the information of the electronic device 200-5, as indicated by A63. Thus, the user can grasp which direction the electronic device 200 is located in.

Such a display can be implemented, for example, by the control unit 150 executing processing of creating an icon of a direction image based on the direction information acquired in the direction information acquisition processing (step S200) in FIG. 2, and processing of displaying the created icon along with the information of the corresponding electronic device 200. Alternatively, such a display may be implemented by the control unit 150 executing processing of selecting an icon of a direction image corresponding to the acquired direction information from a group of icons of a plurality of types of direction images stored in advance in a memory, not illustrated, and displaying the selected icon along with the information of the electronic device 200.

The control unit 150 may also display information representing the status of the electronic device 200 found in the determination processing (step S300) in FIG. 2. The status can also be referred to as the state. As the information representing the status of the electronic device 200, a plurality of types may be employed. Specifically, for example, an icon indicated by A71 in FIG. 8 is a form indicating that the electronic device 200-3 is able to execute a job and is currently on standby. An icon indicated by A72 is a form indicating that the electronic device 200-4 is able to execute a job and is currently executing a job. An icon indicated by A73 is a form indicating that an error has occurred in the electronic device 200-5. The form indicating the status of the electronic device 200 is not limited to the example shown in FIG. 8. For example, the control unit 150 may execute processing of displaying the icon with the color tone of the icon changed so that the user can tell the difference in the status of the electronic device 200, or may execute processing of displaying the icon with the shape of the icon changed so that the user can tell the difference in the status of the electronic device 200. Such processing can be implemented by including information representing the status of the electronic device 200 into the BLE advertisement packet or the like transmitted from the electronic device 200, or the like. The control unit 150 may execute processing of hiding the icon indicating the status such as the icons A71 to A73, for the electronic device 200 that has never been connected to the information processing device 100. In the example shown in FIG. 8, it is assumed that all of the electronic device 200-3, the electronic device 200-4, and the electronic device 200-5 have been connected to the information processing device 100.

In this way, in the information processing device 100 in this embodiment, the control unit 150 executes the display processing of displaying a screen showing that the electronic device 200 that is a target of the determination can execute a job. Thus, the user can properly determine the electronic device 200 to be selected, in view of whether the electronic device 200 can execute a job or not. For example, in FIG. 8, the user understands that it is optimal to select the electronic device 200-3, which is able to execute a job and is currently on standby. Also, for example, when the electronic device 200 included in the list view is only the electronic device 200-5 in the error state, the user can determine that the user should move to search for another electronic device 200, or the like.

The list view indicated by A41 in FIG. 8 shows a list where the electronic devices 200-3 to 200-5 are vertically listed. The control unit 150 may also execute processing of listing the electronic devices 200, based on a predetermined criterion. For example, the control unit 150 may execute processing of listing and displaying the electronic devices 200 in order from the electronic device 200 at the shortest distance from the information processing device 100, as the predetermined criterion. Also, for example, the control unit 150 may execute processing of listing the electronic devices 200, based on a predetermined criterion associated with the direction information. More specifically, for example, the direction in which an antenna, not illustrated, of the information processing device 100 faces, is defined as a first priority direction. The control unit 150 may execute processing of listing and displaying the electronic devices 200 in order from the electronic device 200 located in a direction that is the closest to the first priority direction, based on the direction information acquired in the direction information acquisition processing (step S200). Also, for example, the control unit 150 may execute processing of listing the electronic devices 200, based on a predetermined criterion associated with the status of the electronic device 200, as the predetermined criterion. For example, the control unit 150 may execute processing of displaying the electronic device 200 that can execute a job, above the electronic device 200 in the error state. The control unit 150 may also provide a plurality of the predetermined criteria and execute processing of sorting the electronic devices 200 to be listed, based on each criterion. Thus the user can easily select a desired electronic device 200 according to a criterion to be emphasized. When displaying the list, these processes are not essential and the control unit 150 may simply execute processing of listing and displaying the electronic devices 200 found in the search processing (step S100), in order by the display processing (step S400). Thus, in the information processing device 100 in this embodiment, the control unit 150 executes the display processing of displaying a screen where a list of information of the electronic device 200 located within the range in the predetermined direction, as a screen relating to the electronic device 200 that is a target of the determination. Thus, the user can grasp the electronic device 200 located in a desired range, in the form of a list.

Figure 9:
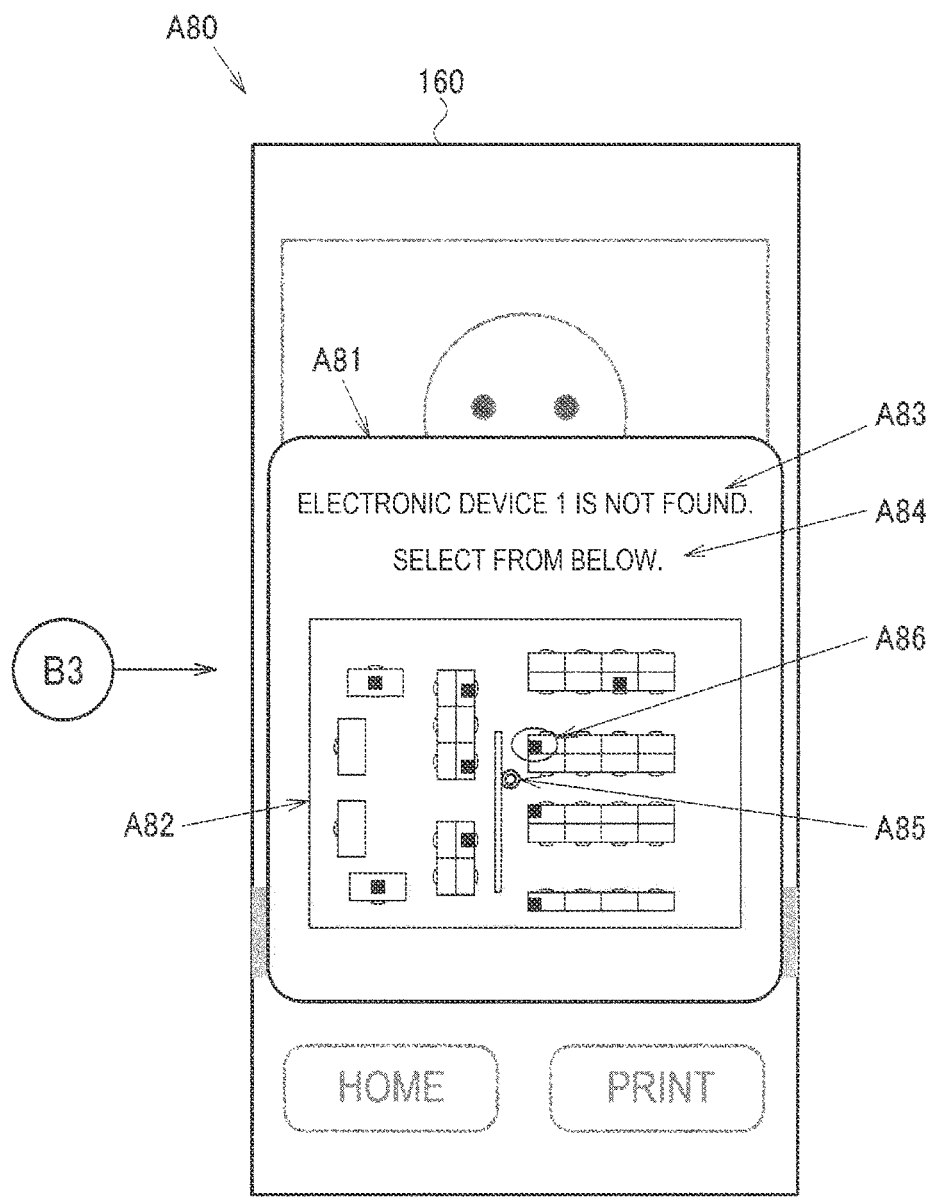
FIG. 9 is another view explaining the screen example to which the technique according to the embodiment is applied.

The screen example indicated by A40 in FIG. 8 is an example where the electronic devices 200 are listed, using a list view. However, this is not limiting. For example, a screen example indicated by A80 in FIG. 9 may be employed. Specifically, the control unit 150 displays a map image where icons indicating the electronic devices 200 are two-dimensionally arranged, as a list view, as indicated by A82 in a dialog box indicated by A81 in FIG. 9. In the map image indicated by A82, the electronic device 200 found in the search processing (step S100) is indicated by a quadrilateral solid black icon. Information indicated by A83 in FIG. 9 is similar to the information indicated by A45 in FIG. 8. Information indicated by A84 in FIG. 9 is similar to the information indicated by A46 in FIG. 8.

The display of the map image indicated by A82 can be implemented, for example, by a technique described below. The control unit 150 executes processing of displaying a map screen that can be displayed on a predetermined application, based on image information of the floor where the electronic device 200 whose location is known is located, the image information being stored in a memory, not illustrated. The control unit 150 also executes processing of displaying an icon indicating the electronic device 200 found in the search processing (step S100) at coordinates corresponding to the map screen, as superimposed on the map screen. The control unit 150 also executes processing of estimating location information of the information processing device 100, based on the direction information of the electronic device 200 acquired in the direction information acquisition processing (step S200) or the like, and processing of displaying an icon indicating the information processing device 100 as superimposed on the map screen, based on the estimated location information.

The processing of estimating the location information of the information processing device 100 can be implemented, for example, by a technique described below. The control unit 150 executes processing of finding an imaginary line connecting the electronic device 200 and the information processing device 100, based on the direction information, with respect to two electronic devices 200. The control unit 150 then executes processing of finding a point of intersection of the two imaginary lines acquired by the above processing, and estimating location information based on the point of intersection, as the location information of the information processing device 100. The control unit 150 executes processing of displaying an icon indicating the information processing device 100, for example, in the form of a double circle indicated by A85, at a location on the map screen corresponding to the estimated location information.

In the list view indicated by A82 in FIG. 9, too, the control unit 150 may display the information of the electronic device 200 that is the nearest from the information processing device 100, of the electronic devices 200 found in the determination processing (step S300) in FIG. 2, in a highlighted form compared with the information of the other electronic devices 200. For example, the control unit 150 executes processing of additionally displaying an icon surrounding the icon of the electronic device 200 that is the nearest from the information processing device 100, as indicated by A86, and thus can display the icon of the electronic device 200 that is the nearest from the information processing device 100, in a highlighted form. The display in a highlighted form is not limited to this example. The control unit 150 may execute display processing of changing the color of the icon, display processing of changing the size of the icon, or display processing of flashing on and off the icon. The display in a highlighted form can be implemented by various techniques.

The technique shown in FIG. 9 may be combined with the technique described with reference to FIG. 8 or the like. For example, the control unit 150 may execute processing of displaying the icon of the electronic device 200 in the standby state, in a first color, and displaying the icon of the electronic device 200 in the error state, in a second color that is different from the first color, though not illustrated. Also, for example, the control unit 150 may execute processing of displaying the icon of the electronic device 200 at a short distance from the information processing device 100, in a first size, and displaying the icon of the electronic device 200 at a longer distance from the information processing device 100 than the electronic device 200 of the first size, in a second size that is smaller than the first size. Also, for example, the control unit 150 may execute processing of displaying the icon of the fixed-location electronic device 200 in a first shape and displaying the mobile electronic device 200 in a second shape that is different from the first shape. The characteristics of the electronic device 200 corresponding to the color, size, and shape of the icon of the electronic device 200 are not limited to the above examples and can be suitably set by the user.

In this way, in the information processing device 100 in this embodiment, the control unit 150 executes the display processing of displaying a screen where an image of the electronic device 200 located within the range in the predetermined direction is displayed on a map image, as a screen relating to the electronic device 200 that is a target of the determination. Thus, the user can visually determine the information of the electronic device 200 located in a desired range. Therefore, the user can more properly determine the electronic device 200 to be selected. For example, as the map image includes information of an aisle or the like, the user can properly determine the electronic device 200 that can be accessed most easily from the information processing device 100.

As described above, the example of processing shown in FIG. 2 is periodically repeated. Therefore, the displays shown in FIGS. 6 to 9 are periodically updated and the display content may be changed due to a predetermined circumstance. The predetermined circumstance is, for example, a circumstance where the power of one of the electronic devices 200 has turned on or off, a circumstance where the electronic device 200 has an unexpected malfunction, a circumstance where the information of distance or direction is changed due to a movement of the information processing device 100 or the electronic device 200, or the like. The same applies to a display example in a modification example described later with reference to FIG. 11.

The technique in this embodiment is not limited to the above and can be implemented with various modifications. The display processing (step S400) in FIG. 4 is the processing of displaying a predetermined icon in such a way that an operation on the predetermination icon is enabled after the information processing device 100 and the electronic device 200 are connected to each other. However, for example, processing of displaying a predetermined icon in such a way that an operation on the predetermined icon is enabled when the result of the determination processing (step S300) includes an electronic device 200, may be executed. This is because some users may want to execute a job regardless of the positional relationship with the electronic device 200, as long as it is confirmed that a connectable electronic device 200 is located within the range in the predetermined direction. Specifically, the control unit 150 can change the processing example of the display processing from step S400 in FIG. 2 to step S1400 in FIG. 10 and thus can implement such processing.

Figure 10:
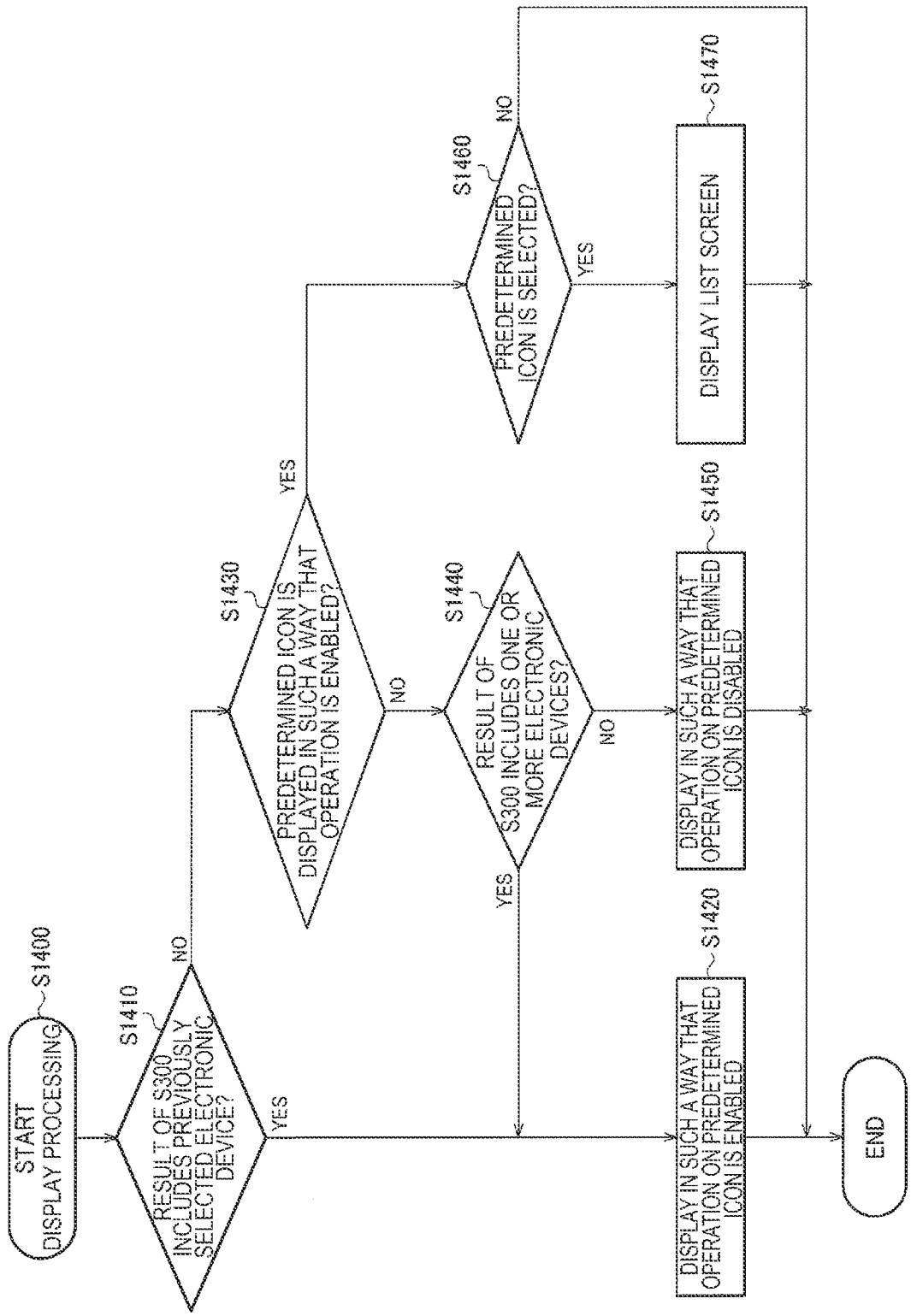
FIG. 10 is a flowchart explaining a processing example of display processing in a modification example.

FIG. 10 is a flowchart explaining, in detail, a processing example of display processing (step S1400) in a modification example. For example, the control unit 150 executes processing of determining whether the result of the determination processing (step S300) includes the previously selected electronic device 200 or not (step S1410). When the control unit 150 has determined that the result of the determination processing (step S300) includes the previously selected electronic device 200 (YES in step S1410), the control unit 150 executes processing of displaying a predetermined icon in such a way that an operation on the predetermined icon is enabled (step S1420), and then ends the flow. Meanwhile, when the control unit 150 has determined that the result of the determination processing (step S300) does not include the previously selected electronic device 200 (NO in step S1410), the control unit 150 executes processing of determining whether the predetermined icon is displayed in such a way that an operation thereon is enabled, or not (step S1430). When the control unit 150 has determined that the predetermined icon is not displayed in such a way that an operation thereon is enabled (NO in step S1430), the control unit 150 executes processing of determining whether the result of the determination processing (step S300) includes one or more electronic devices 200 or not (step S1440). When the control unit 150 has determined that the result of the determination processing (step S300) does not include one or more electronic devices 200 (NO in step S1440), the control unit 150 executes processing of displaying the predetermined icon in such a way that an operation on the predetermined icon is disabled (step S1450), and then ends the flow. Meanwhile, when the control unit 150 has determined that the result of the determination processing (step S300) includes one or more electronic devices 200 (YES in step S1440), the control unit 150 executes the processing of step S1420. Also, when the control unit 150 has determined that the predetermined icon is displayed in such a way that an operation on the predetermined icon is enabled (YES in step S1430), the control unit 150 executes processing of determining whether the predetermined icon is selected or not (step S1460). When the control unit 150 has determined that the predetermined icon is selected (YES in step S1460), the control unit 150 executes processing of displaying a list screen (step S1470) and then ends the flow. Meanwhile, when the control unit 150 has determined that the predetermined icon is not selected (NO in step S1460), the control unit 150 ends the flow.

Figure 11:
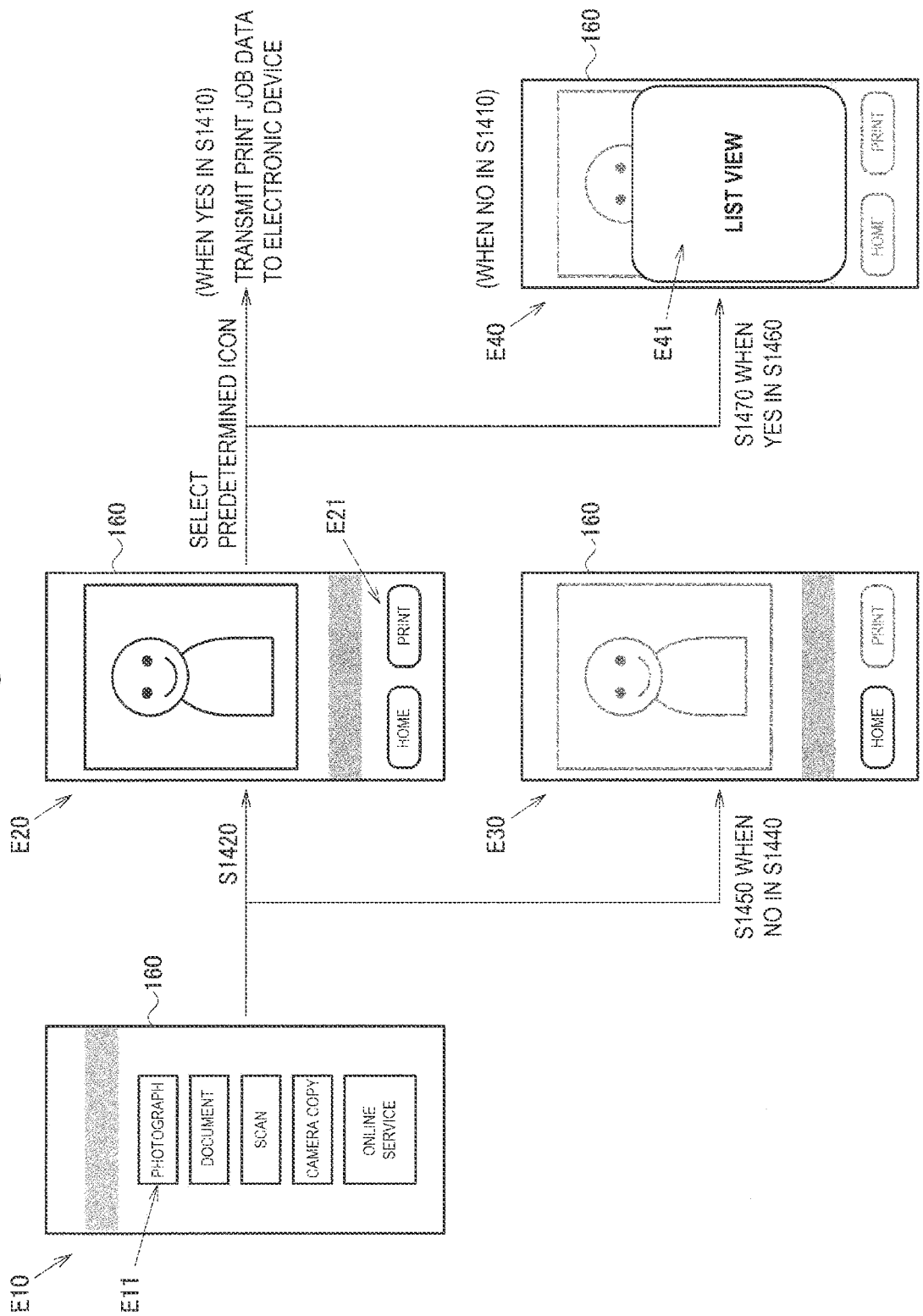
FIG. 11 explains an example of screen transition in the modification example.

A transition of the screen when the display processing (step S1400) in FIG. 10 is executed will now be described, using FIG. 11. A screen indicated by E10 in FIG. 11 is similar to the screen indicated by A10 in FIG. 5. It is assumed that the user selects an icon of a photograph panel indicated E11 similar to A11 in FIG. 5. When the result of the determination processing (step S300) includes the previously selected electronic device 200 (YES in step S1410), the control unit 150 executes step S1420 in FIG. 10 and therefore executes processing of displaying a screen indicated by E20 similar to the screen indicated by A20 in FIG.

6. Meanwhile, when the result of the determination processing (step S300) does not include the previously selected electronic device 200 but includes one or more electronic devices 200, the control unit 150 gives YES in step S1440 in FIG. 10 and executes step S1420, and therefore similarly executes the processing of displaying the screen indicated by E20. That is, the user cannot distinguish whether the result of the determination processing (step S300) includes the previously selected electronic device 200 or does not include the previously selected electronic device 200 but includes one or more electronic devices 200, based on the screen of E20 alone. However, this poses no problem when it is important that the user can recognize the circumstance where the electronic device 200 located in the predetermined range can execute a print job, as described above. Meanwhile, when the result of the determination processing (step S300) includes no electronic device 200, the control unit 150 gives NO in step S1440 in FIG. 10 and executes step S1450, and therefore executes processing of displaying a screen indicated by E30.

It is now assumed that the user selects, for example, a print button icon indicated by E21 as the predetermined icon. When the result of the determination processing (step S300) includes the previously selected electronic device 200 (YES in step S1410), the control unit 150 executes processing of transmitting print job data to the electronic device 200. Such processing can be implemented by a technique described below. Although the illustration of a flow is omitted, for example, processing of turning on a predetermined flag when YES in step S1410 in FIG. 10 is added. The control unit 150 then executes processing of determining whether the predetermined flag is on or not, when the predetermined icon indicated by E21 in FIG. 11 is selected. When the predetermined flag is on, the control unit 150 executes the processing of transmitting print job data to the electronic device 200.

Meanwhile, when it is determined that the result of the determination processing (step S300) includes no electronic device 200 and the predetermined icon is displayed in such a way that an operation on the predetermined icon is enabled, the control unit 150 gives YES in step S1460 and executes step S1470, and therefore executes processing of displaying a screen indicated by E40. The screen of E40 is similar to, for example, A40 in FIG. 8. A screen indicated by E41 in FIG. 11 is, for example, the list view indicated by A41 in FIG. 8, though the specific illustration thereof is omitted. The control unit 150 may also execute processing of displaying the screen of E40 similarly to the screen indicated by A80 in FIG. 9. That is, the control unit 150 may execute processing of displaying the screen indicated by E41 in FIG. 11 similarly to the list view indicated by A81 in FIG. 9.

As described above, the information processing device according to this embodiment wirelessly communicates with an electronic device via a wireless communication unit and includes a search result acquisition unit, a direction information acquisition unit, and a control unit. The search result acquisition unit acquires information of a search result about the electronic device by a search via the wireless communication unit. The direction information acquisition unit acquires direction information representing a direction in which the electronic device exists, by short-range wireless communication with the electronic device via the wireless communication unit. The control unit makes a determination about whether the electronic device found by the search is located within a range in a predetermined direction or not, based on the information of the search result and the direction information, and executes display processing of displaying a screen relating to the electronic device that is a target of the determination.

Thus, the user can grasp the electronic device located within the range in the predetermined direction. Therefore, the user can properly determine the electronic device to be selected.

The control unit may execute display processing of displaying a screen showing that the electronic device that is the target of the determination can execute a job.

Thus, the user can properly determine the electronic device to be selected, in view of whether the electronic device can execute a job or not.

The control unit may execute processing of enabling an operation on an icon indicating the execution of the job when a result of the determination shows that the electronic device is located within the range in the predetermined direction, and may execute processing of disabling the operation on the icon when the result of the determination shows that the electronic device is not located within the range in the predetermined direction.

Thus, the user can grasp whether the electronic device that can execute a job is located within a desired range or not.

The control unit may execute processing of determining whether the electronic device is located within a predetermined angle range including a horizontal direction, as the range in the predetermined direction.

Thus, the user can mainly grasp information of the electronic device located in the horizontal direction.

When a result of the determination shows that a plurality of the electronic devices are found by the search and located within the range in the predetermined direction, the control unit may execute display processing of showing that the plurality of the electronic devices are located within the range in the predetermined direction.

Thus, the user can grasp the existence of a plurality of electronic devices located in a desired range.

The control unit may execute display processing of displaying a screen where a list of information of the electronic device located within the range in the predetermined direction is displayed, as the screen relating to the electronic device that is the target of the determination.

Thus, the user can grasp the electronic device located in a desired range, in the form of a list.

The control unit may execute display processing of displaying a screen where an image of the electronic device located within the range in the predetermined direction is displayed on a map image, as the screen relating to the electronic device that is the target of the determination.

Thus, the user can visually determine the information of the electronic device located in a desired range.

The program according to this embodiment causes a computer to function as a wireless communication unit wirelessly communicating with an electronic device, a search result acquisition unit, a direction information acquisition unit, and a control unit. The search result acquisition unit acquires information of a search result about the electronic device by a search via the wireless communication unit. The direction information acquisition unit acquires direction information representing a direction in which the electronic device exists, by short-range wireless communication with the electronic device via the wireless communication unit. The control unit makes a determination about whether the electronic device found by the search is located within a range in a predetermined direction or not, based on the information of the search result and the direction information, and executes display processing of displaying a screen relating to the electronic device that is a target of the determination.

The embodiment has been described above in detail. However, a person skilled in the art can readily understand that various modifications can be made without substantially departing from the new matters and effects of the embodiment. Therefore, all such modification examples are included in the scope of the present disclosure. For example, a term described along with a different term having a broader meaning or the same meaning at least once in the specification or the drawings can be replaced with the different term at any point in the specification or the drawings. Also, all combinations of the embodiment and modification examples are included in the scope of the present disclosure. The configurations and operations of the information processing device and the program or the like are not limited to those described in the embodiment and can be implemented with various modifications.

What is claimed is:

1. An information processing device wirelessly communicating with an electronic device via a wireless communication unit, the information processing device comprising:
    a search result acquisition unit configured to acquire, via the wireless communication unit, information representing a search result of a search of the electronic device;
    a direction information acquisition unit configured to acquire direction information representing a direction in which the electronic device exists, the acquisition being by short-range wireless communication with the electronic device via the wireless communication unit; and
    a controller configured to make a determination, based on the information representing the search result and the direction information, of whether or not the electronic device found by the search is located within a range in a predetermined direction, and in response executing display processing of displaying a screen relating to the electronic device that is a target of the determination,
    the controller further configured to execute a display processing of displaying a screen identifying the electronic device that is the target of the determination can execute a job,
    the controller configured to execute processing of enabling an operation on an icon indicating execution of the job when a result of the determination shows that the electronic device is located within the range in the predetermined direction, and execute processing of disabling the operation on the icon when the result of the determination shows that the electronic device is not located within the range in the predetermined direction.

2. The information processing device according to claim 1, wherein
    the controller is configured to execute processing of determining whether the electronic device is located within a predetermined angle range including a horizontal direction, as the range in the predetermined direction.

3. The information processing device according to claim 1, wherein
    when a result of the determination shows that a plurality of the electronic devices are found by the search and located within the range in the predetermined direction, the controller is configured to display processing of identifying that the plurality of the electronic devices are located within the range in the predetermined direction.

4. The information processing device according to claim 1, wherein
    the controller is configured to execute display processing of displaying a screen where a list of information of the electronic device located within the range in the predetermined direction is displayed, as the screen relating to the electronic device that is the target of the determination.

5. The information processing device according to claim 1, wherein
    the controller is configured to execute display processing of displaying a screen where an image of the electronic device located within the range in the predetermined direction is displayed on a map image, as the screen relating to the electronic device that is the target of the determination.

6. A non-transitory computer-readable storage medium storing a program, the program causing a computer to function as:
    a wireless communication unit wirelessly communicating with an electronic device;
    a search result acquisition unit acquiring, via the wireless communication unit, information representing a search result of a search of the electronic device;
    a direction information acquisition unit acquiring direction information representing a direction in which the electronic device exists, by short-range wireless communication with the electronic device via the wireless communication unit; and
    a controller making a determination, based on the information representing the search result and the direction information, of whether or not the electronic device found by the search is located within a range in a predetermined direction, and in response executing display processing of displaying a screen relating to the electronic device that is a target of the determination,
    the controller further executing a display processing of displaying a screen identifying the electronic device that is the target of the determination can execute a job,
    the controller configured to execute processing of enabling an operation on an icon indicating execution of the job when a result of the determination shows that the electronic device is located within the range in the predetermined direction, and execute processing of disabling the operation on the icon when the result of the determination shows that the electronic device is not located within the range in the predetermined direction.

* * * * *